W. J. STERLING.
MOLDING MACHINE.
APPLICATION FILED FEB. 7, 1905. RENEWED MAR. 17, 1909.
937,885.
Patented Oct. 26, 1909.
5 SHEETS—SHEET 4.
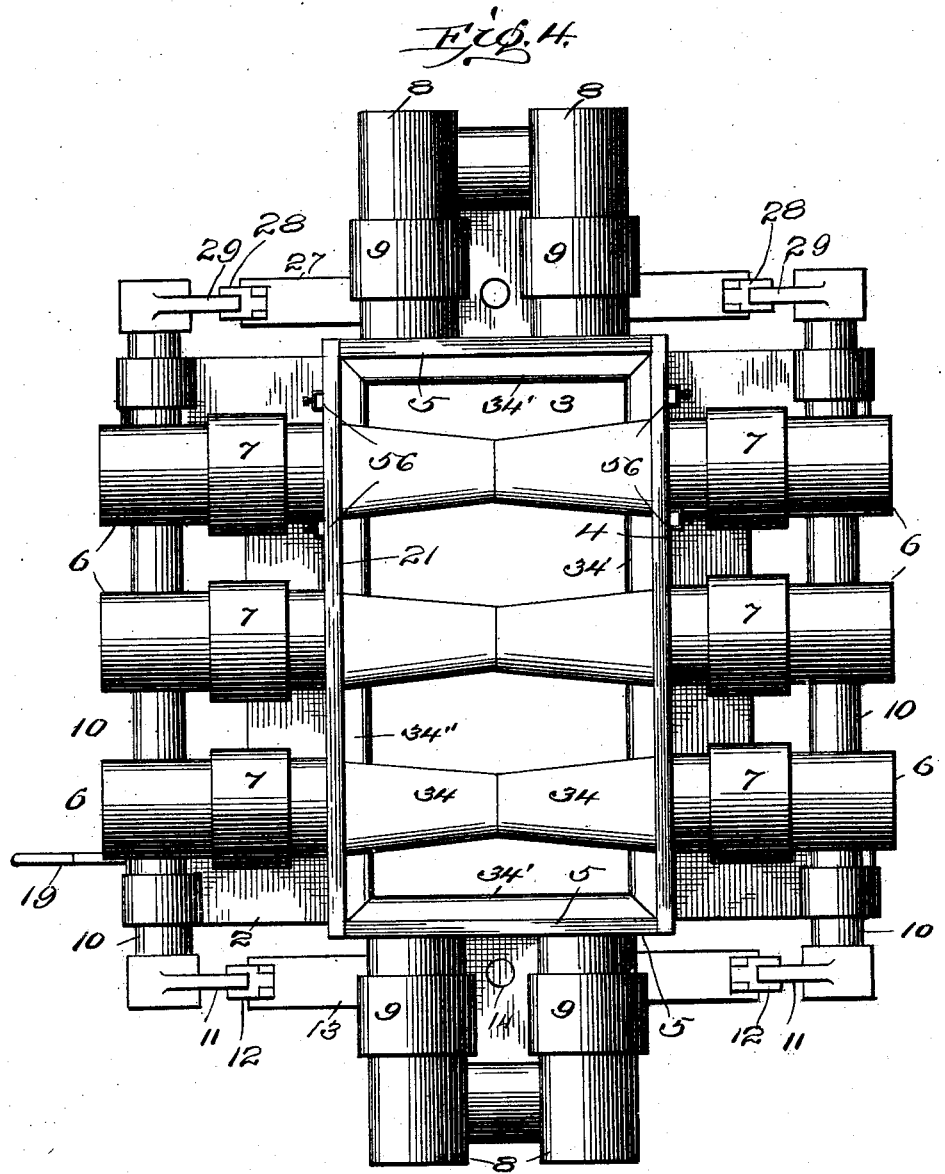

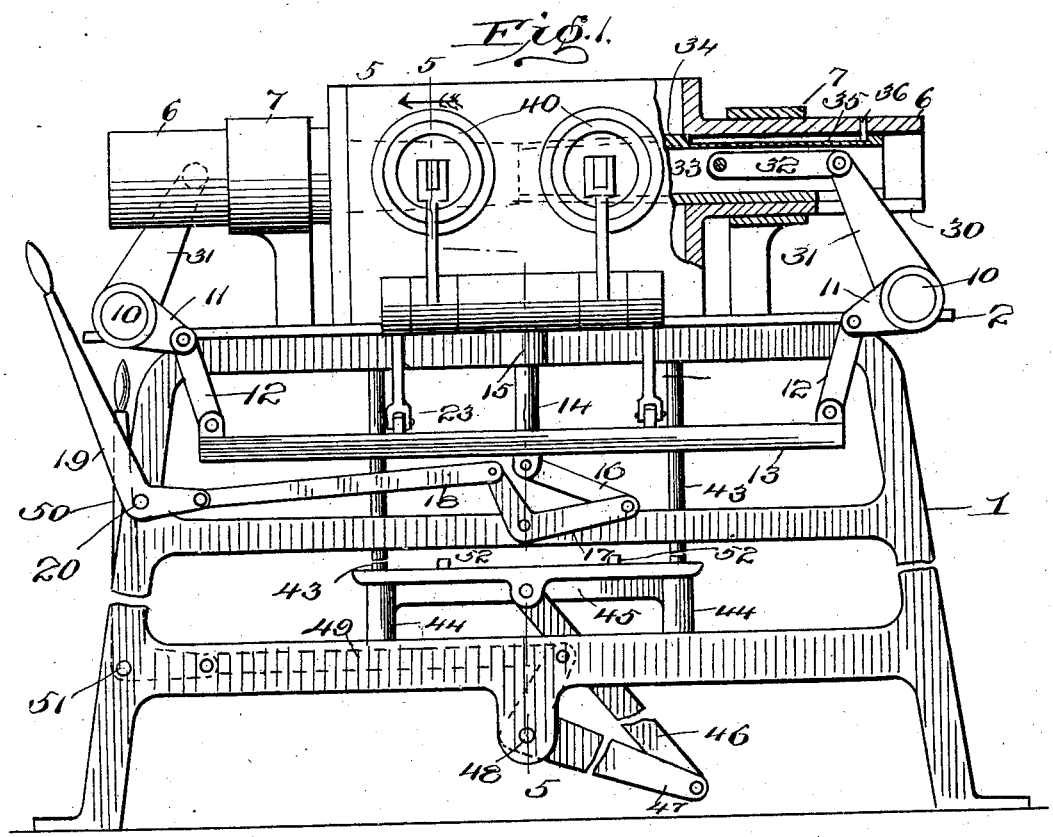

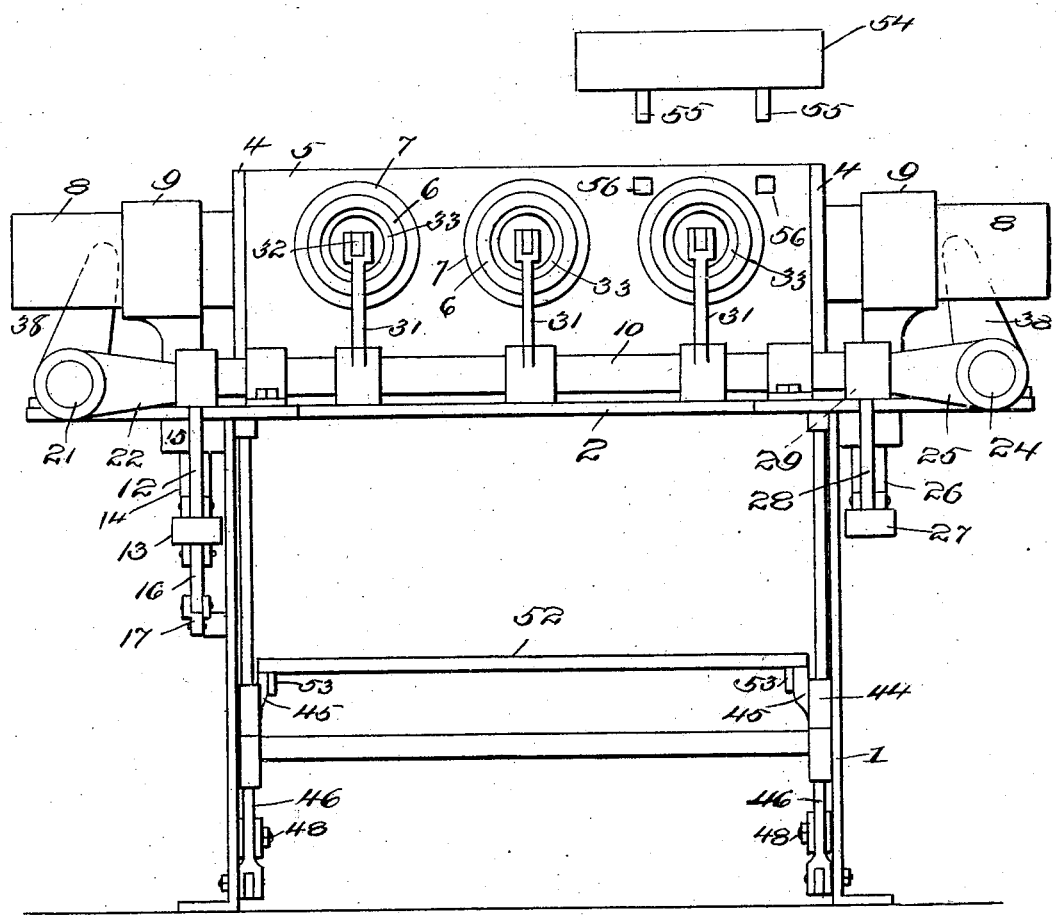

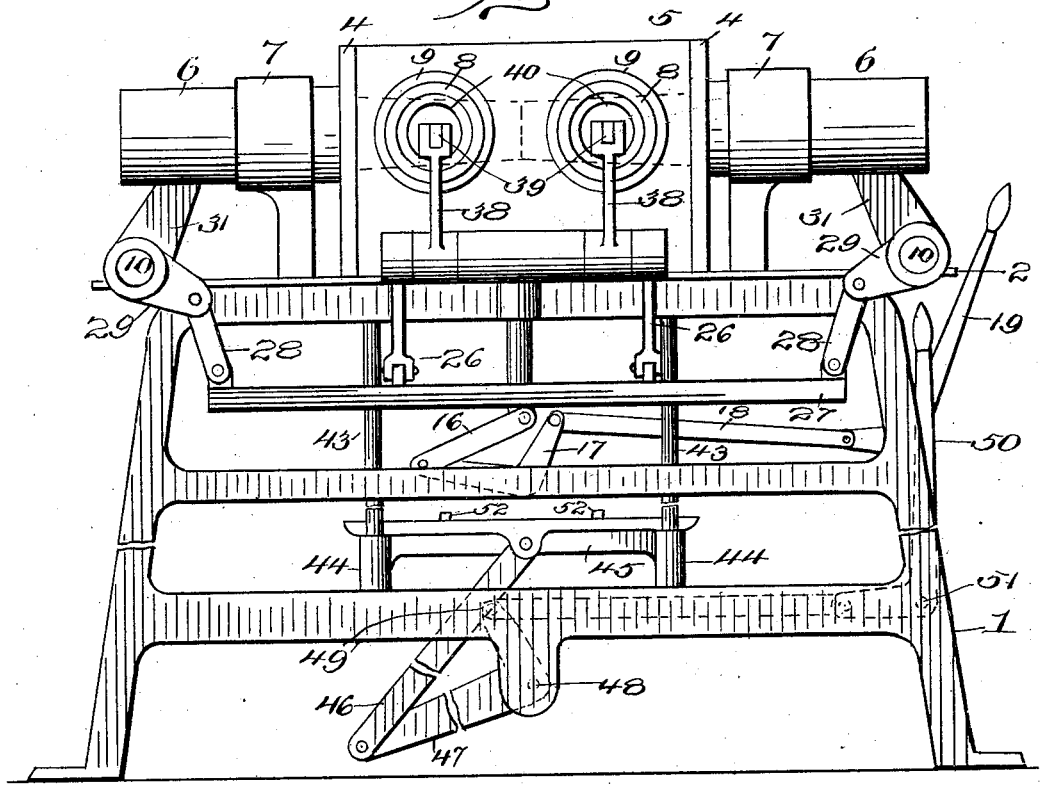

W. J. STERLING.
MOLDING MACHINE.
APPLICATION FILED FEB. 7, 1905. RENEWED MAR. 17, 1909.
937,885.
Patented Oct. 26, 1909.
5 SHEETS—SHEET 5.
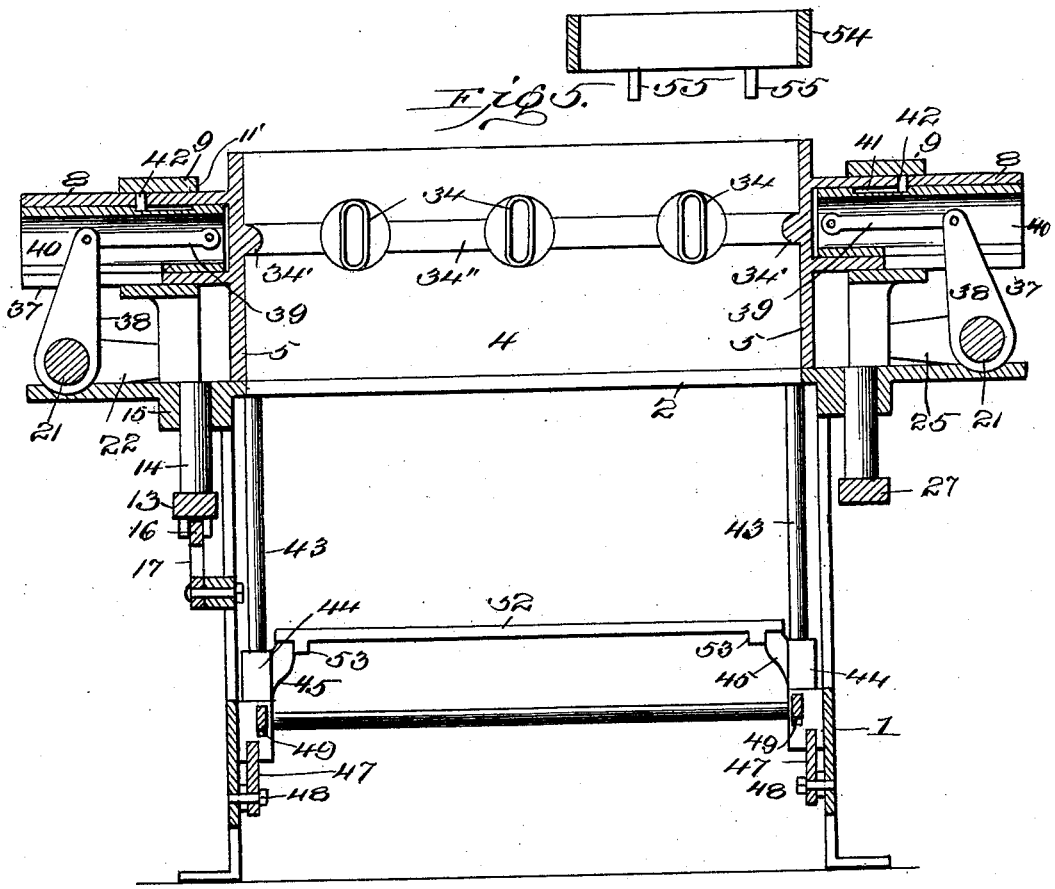
Witnesses
J. M. Fowler Jr
Edgar M. Kitchin
Inventor
William J. Sterling,
By Mason, Fenwick & Lawrence
Attorneys

UNITED STATES PATENT OFFICE.

WILLIAM J. STERLING, OF PORTSMOUTH, VIRGINIA.

MOLDING-MACHINE.

937,885.  Specification of Letters Patent.  Patented Oct. 26, 1909.

Application filed February 7, 1905, Serial No. 244,661. Renewed March 17, 1909. Serial No. 483,947.

*To all whom it may concern:*

Be it known that I, WILLIAM J. STERLING, a citizen of the United States, residing at Portsmouth, in the county of Norfolk and State of Virginia, have invented certain new and useful Improvements in Molding-Machines; and I do hereby declare the following to be a full, clear, and exact description of the invention, such as will enable others skilled in the art to which it appertains to make and use the same.

This invention relates to improvements in molding machines, and more particularly to the type provided with movable sides and ends.

Among the several objects in view is the provision of cores moving independently of the movable sides and ends, and a further object is the obviation of intermeshing gears; and the provision of means for simultaneously actuating the several core sections and for moving the sides and ends of the mold in timed relation to the movement of the core sections.

With these and further objects in view, the invention comprises the combination with movable sides and ends of a mold and movable core sections, of links and levers for actuating said core sections and mold sides and ends.

It further comprises certain other novel constructions, combinations, and arrangements of parts, which will be hereinafter fully described and claimed.

In the accompanying drawing: Figure 1 represents a view in side elevation of a molding apparatus embodying the features of the present invention, parts being broken away for disclosing interior structure. Fig. 2 represents a front view of the same. Fig. 3 represents a view in side elevation of the opposite side of the machine from that seen in Fig. 1. Fig. 4 represents a top plan view of the machine. Fig. 5 represents a vertical, central section taken on the plane of line 5, 5 of Fig. 1 and looking in the direction indicated by the arrow.

It has been proposed heretofore to move the sides and ends of a mold by means of gears and racks, but it is found, in practice, that particles of the material being operated upon frequently fall between the intermeshing teeth of the gears and produce friction to such an extent as to make the operation of the machine difficult, if not impossible. I propose obviating this difficulty and accomplishing further valuable results by the employment of elements such as are disclosed in the accompanying drawing, in which—

1 indicates a suitable framework carrying a table 2 provided with a central opening 3 surrounded by the sides 4, 4 and ends 5, 5 of the mold of the present improved machine. The sides 4 and ends 5 are movably mounted, and each of said sides is carried by a plurality of guiding cylinders 6, 6 extending through guiding casings 7, 7. The ends 5 are carried by similar cylinders 8, 8 extending through similar guiding casings 9, 9. Rock shafts 10 are journaled in suitable bearings upon the table 2, one of said rock shafts being spaced from and arranged upon the corresponding side of the table 2 with each of the sides 4.

Extending radially from each of the shafts 10, at one end thereof, is a crank arm 11, which arm, in turn, is pivotally connected to a link 12, the links 12 having their lower ends pivotally connected with the opposite ends of an actuating bar 13. A rod 14 is connected to the bar 13 preferably centrally thereof, and extends upwardly through a guiding casing 15 for preventing lateral play of the bar 13, and an actuating link 16 pivotally engages the bar 13 beneath the rod 14. The link 16 is pivoted at its lower end to one arm of a bell crank lever 17, said bell crank lever having its other arm pivoted to a link 18. The outer end of the link 18 is pivotally connected with a lever 19, which is adapted to be swung upon its pivot 20 for causing the bar 18 to move longitudinally. Longitudinal movement of the bar 18 will, as will be apparent from the disclosure in Fig. 1, effect pivotal movement of the bell crank lever 19 and longitudinal movement of the link 16, producing vertical movement of the bar 13 and parts connected therewith.

A rock shaft 21 is journaled at one end of the table 2 above the bar 13 and is connected therewith by means of radial crank arms 22, 22 pivotally engaging the links 23, 23, which links, in turn, pivotally engage the bar 13. Thus it will be observed that vertical movement of the bar 13 is adapted to rock both of the shafts 10 and the shaft 21. A shaft 24 is journaled upon the table 2 at the opposite end from shaft 21, and is provided with crank arms 25, 25 extending to the crank arms 22 and pivotally connected with links 26, 26, said links 26 being pivoted, at their lower end, to an operating bar 27, which bar is adapted to be moved vertically by means of links 28, 28 pivotally engaging the ends of the bar 27, and connected, at their upper ends, to crank arms 29, 29 extending from the rock shaft 10, whereby vertical movement of the bar 13 is designed to effect a similar movement of the bar 27 through the shafts 10, and the rock shaft 24 is adapted to be actuated by the bar 27, links 26, and arms 25 to a corresponding degree to which the shaft 21 is actuated.

All of the cylinders 6 and parts inclosed thereby are exact duplicates of each other and, therefore, a description of one will be sufficient for making clear the construction of all. By reference to Fig. 1, it will be seen that each of the cylinders 6 is slotted on its under surface, as at 30, within which slot plays a lever arm 31 projecting radially from the rock shaft 10. A link 32 is pivoted to the free end of arm 31 and is pivotally connected at its opposite end to a cylindrical slide 33, said slide 33 fitting snugly within the respective cylinder 6. The inner end of the slide 33 carries a core section 34 of a length equal to half the width of the mold made up of the sides 4 and ends 5. Each of the core sections 34 is tapered from its outer end to its inner end, and, as the cylindrical casings 6 are arranged in pairs opposite each other, the core sections 34 are adapted to meet centrally of the mold for producing complete cores. The slide 33 is formed with a longitudinal groove 35 into which projects a limiting pin 36 carried by the cylindrical casing 6, so that, when the slide 33 is moved longitudinally to a sufficient degree, the end wall of the groove 35 will contact with the pin or lug 36 and will cause the casing 6 to move with said slide, whereby the sides 4 of the mold may be moved, the casings 6 being formed integral with or suitably secured to said sides.

Each of the cylinders 8 is slidably mounted within its casing 9 and is formed with a longitudinal slot 37, within which plays a crank arm 38 carried by the shaft 21 or the shaft 24. A link 39 is pivotally connected to the free end of each arm 38, and each link 39 is, in turn, pivotally connected with a slide 40. A longitudinal groove 41 is formed in the slide 40, and a lug or pin 42 extends from each cylindrical casing 8 into the groove 41 of the respective slide, so that, in operation, when the arm 38 is swung outwardly, the slide 40 will be moved outwardly until the inner end wall of the groove 41 contacts with the lug 42, and the cylindrical casing 8 will be caused to travel with the slide 40. A return stroke of the arm 38 will cause the opposite end wall of groove 41 to engage pin 42 and thereby cause the cylindrical casing 8 to move to its former position. As the ends 5 are connected with the cylindrical casings 8, it will be seen that said ends will be moved inwardly and outwardly upon the rocking of shafts 21 and 24, the extent of movement of the ends 5 being sufficient for causing the rail 34' carried by the respective end 5, and hereinafter mentioned, to move beyond the plane of the inner face of the respective end 5 when said end is in its normal, closed condition.

It is to be noted that the groove 35 in each of the slides 33 is of sufficient length to permit the withdrawal of the core sections 34 to a sufficient extent for causing their inner ends to assume a position flush with the inner surface of the respective side 4 before any movement of the side occurs, and it will be further observed that the return movement of the arms 31 will cause a projection of the core sections 4 to their full extent beyond the respective side 4 before the side is moved and that the sides 4 will, of course, be returned to their normal, closed condition by contact of the lug 36 with the outer end wall of the grooves 35, the movement of the sides 4 being only sufficient for providing a clearance for the contained block.

Arranged beneath each end of the table 2 and suitably connected with the respective sides of the frame 1 are guiding rods 43, 43, each surrounded by a sleeve 44 rigidly connected to a cross head 45. To each cross head 45 is pivoted a link 46 extending downwardly and pivotally engaging one arm of a bell crank lever 47, each of said bell crank levers being pivoted, as at 48, to the respective sides of the frame 1. A link 49 pivotally engages the upper arm of the bell crank lever 47 and extends to and is pivotally connected with one end of an operating lever 50, said lever 50 being adapted to be swung downwardly, upon its pivot 51 carried by the respective side of the frame 1, for causing an upward movement of the lower arm of bell crank lever 47, which movement imparts a corresponding movement to the respective cross head 45. Resting upon the cross heads 45 are suitable bars 52, 52, each provided with a depending finger 53 at each end engaging the inner surface of the respective cross head 45 for preventing longitudinal movement of the bar 52. The bars 52 are disposed immediately beneath the opening 3 and are adapted to support a pallet, so that in operation, when a pallet is positioned upon said bars, the lever 50 may be swung downwardly and said pallet be caused to assume a position just within the lower edge of the mold formed of the sides 4 and ends 5.

As above suggested, each of the ends 5 is provided with a rail 34' arranged horizontally centrally of the said ends in position for producing a horizontal bonding opening in the ends of the finished block, and the sides 4 are provided with a similar rail 34″ disposed between the core sections 34 in position for producing a longitudinal bonding opening in the sides of the finished block. The railing 34″ is, of course, arranged in the same horizontal plane with the railing 34′, so that a block formed within the mold will be provided with a bonding groove extending on both sides and ends in position for receiving a mortar key for locking the block to surrounding, similar blocks.

In operating the machine in practice, the bars 52 are provided with a pallet and are raised to a position with the pallet closing the mold formed of the sides 4 and ends 5, and the material from which the block is to be formed is placed within said mold and preferably manually or otherwise suitably tamped down upon the pallet and about the core sections 34. As soon as the mold has been filled up completely with material and the material has been properly tamped, the lever 19 is swung downwardly to the required extent for elevating the bar 13 sufficient for causing the shafts 10, 21, and 24 to be rotated to the required extent for causing the mold sections 34, sides 4, and the ends 5 to be moved out of the planes of the sides and ends of the contained block. Next, the lever is elevated for permitting the pallet resting upon the bars 52 to descend, the said bars 52 traveling downwardly to an extent slightly greater than the width of the block supported thereby for permitting the block to clear the table 2, and any suitable truck may be moved beneath the bars 52 for receiving the block and bars. If desired, the bars may be removed with the block and manually replaced, or the block with its pallet may be removed from the bars 52 in any preferred manner.

When it is desired to produce a block having a return portion for the corner of the wall or in other words a right-angled section upon the block, I contemplate providing a rectangular, or other suitably shaped casing 54 provided, at each end, with depending bars 55, 55 positioned for passing between looped cleats 56, 56 fixed to the outer faces of the sides 4, said bars 55 being adapted to be passed into engagement with said cleats for retaining the casing 34 upon the upper edge of the mold when the mold is in a closed condition. When using the rectangular casing 54, after the mold sides and ends have been brought together, as indicated in Fig. 4, the casing as placed down upon the mold and the material is tamped down within the mold, and then sufficient material is placed within the casing 54 for filling the same, and is tamped therein the material within said casing extending for the height of the casing above and at right angles to the main body portion of the block. After the casing 54 has been filled and tamped, said casing is removed vertically, and the sides and ends of the mold separated, as described, the block being discharged from beneath, as above mentioned. In this manner, it will be observed that it is possible to produce a right angle section upon a block for constituting the return portion for a corner for tie purposes, the production of such return portion not necessitating any material alteration in the structure of the sides and ends of the mold.

Having thus fully described my invention, what I claim as new and desire to secure by Letters Patent is:

1. In a molding apparatus, the combination with a mold having movable sides, of core sections movable horizontally through said sides, means for moving said core sections independently of said sides, and means actuated by the core section operating means for moving said sides.

2. In a molding apparatus, the combination with a mold having movable sides, of core sections movable through said sides, means for moving said core sections independently of the sides, and means actuated by the core section operating means for moving said sides after a predetermined movement of the core sections.

3. In a molding apparatus, the combination with a mold having movable sides, of means for guiding said sides in their movement, core sections adapted to be projected into said mold, and means carried by the guiding means for said sides for actuating said core sections.

4. In a molding apparatus, the combination with a mold, of cores movable through the sides thereof, slides carrying said cores, and means for simultaneously actuating said slides.

5. In a molding apparatus, the combination with a mold having movable sides, of core sections movable through the sides thereof, slides carrying said core sections, means for actuating said slides, and means actuated by the slides for moving said sides.

6. In a molding apparatus, the combination with a mold having movable sides, of cores movable into said mold, slides carrying said cores, means for moving said slides independently of said sides, and means connected with the sides for imparting movement thereto from said slides.

7. In a molding apparatus, the combination with a mold having movable sides, of a guiding casing carried by each of said sides, a slide within said casing, mold sections connected with said slides, means for moving said slides, and means carried by said casing adapted to engage said slides for imparting movement from the slides to the sides.

8. In a molding apparatus, the combination with a mold having movable sides, of a guiding casing connected with each of said sides, a slide within each of said casings movable independently of said casings, a core section carried by each of said slides, means for operating said slides, and means interposed between each of said slides and casings for limiting the degree of independent movement of the respective slide.

9. In a molding apparatus, the combination with a mold having movable sides, of an inclosing casing connected with each of said slides, a slide movable within each of said casings independently thereof, and means for imparting movement from each of said slides to its respective casing.

10. In a molding apparatus, the combination with a mold having movable sides, of a casing connected with each of said sides, a slide movably mounted within each of said casings, and means projecting from each of said casings in the path of movement of each of said slides for limiting the independent movement of the slides within the casings.

11. In a molding apparatus, the combination with a mold having movable sides, of a casing connected with each of said sides, a slide movably mounted within each of said casings and formed with a longitudinal groove, and a pin projecting from each of said casings into the groove of its respective slide.

12. In a molding apparatus, the combination with a mold having movable sides, of a cylindrical, inclosing casing connected with each of said sides, a cylindrical slide within each of said casings and movable independently thereof, means for limiting the independent movement of each of said slides with respect to its corresponding casing, and means for actuating said slides.

13. In a molding apparatus, the combination with a mold having movable sides, of sleeves carried by said sides, slides longitudinally movable within said sleeves, each of said slides being formed with a longitudinal groove, a pin projecting from each of the sleeves into the groove of the respective slide, a core section carried by each of said slides, and means for moving said slides for actuating said core sections and sides.

14. In a molding apparatus, the combination with a mold having movable sides, of a bar, one end of said mold positioned for moving bodily vertically, rock shafts journaled at the opposite sides of said mold, connections between the ends of said bar and said rock shafts for imparting movement to the rock shafts from the bar, and means for moving the bar.

15. In a molding apparatus, the combination with a mold having movable side and a movable end, of a rock shaft journaled opposite said movable side parallel thereto and a rock shaft journaled opposite said movable end parallel thereto, means for actuating one of said rock shafts, link and arm connections for imparting movement from the actuated rock shaft to the other rock shaft, and means operated by said rock shafts for actuating said side and end.

16. In a molding apparatus, the combination with a mold having movable sides and ends, of a rock shaft journaled opposite each of said sides and ends parallel thereto, means for actuating one of said rock shafts, link and arm connections actuated by some of said rock shafts for actuating others thereof, and means actuated by said rock shafts for operating the sides and ends.

17. In a molding apparatus, the combination with a mold having movable sides and ends, of rock shafts journaled opposite each of said shafts and ends, an arm projecting from each of said rock shafts, a link engaging each of said arms, means connecting said links for producing simultaneous action of the rock shafts, means for actuating said connecting means for simultaneously actuating said rock shafts, and means actuated by said rock shafts for moving said sides and ends.

18. In a molding apparatus, the combination with a mold having movable sides and ends, of rock shafts journaled opposite each of said sides and ends, a bar spaced beneath one of said rock shafts, connections between said bar and rock shaft, means for actuating said bar for operating the rock shaft connected therewith, means actuated by said rock shaft for operating the other rock shaft, and means operated by said rock shafts for moving said sides and ends.

19. In a molding apparatus, the combination with a mold having movable sides and ends, of rock shafts journaled opposite said sides and ends, a bar spaced beneath each of the end rock shafts, links and levers connecting said rock shafts with said bars, means for moving said bars for operating said rock shafts, and means actuated by said rock shafts for moving said sides and ends.

20. In a molding apparatus, the combination with a mold having movable sides and ends, of a rock shaft journaled opposite each of said sides and ends, an arm projecting from each of the said shafts at each end thereof, an arm projecting from each rock shaft, a link carried by each of said arms, bars connected with the links at the opposite ends of said mold, means for actuating one of said bars for operating all of said rock shafts, and means actuated by the rock shafts for moving said sides and ends.

21. In a molding apparatus, the combination with a mold having movable sides, of a vertically reciprocating element at one end of said mold, a rock shaft journaled opposite each of the sides of said mold, connections between said vertically reciprocating element and rock shafts for actuating the rock shafts, and means actuated by said rock shafts for moving said sides horizontally.

22. In a molding apparatus, the combination with a mold having movable sides and ends, of a rock shaft journaled opposite each of said sides and ends, a movably mounted element, links and levers connecting said element with some of said rock shafts, means for actuating said movably mounted element for operating the rock shafts connected therewith, means actuated by the thus operated rock shafts for operating the other rock shaft, and means actuated by said rock shafts for moving said sides and ends.

23. In a molding apparatus, the combination with a mold having movable sides and ends, of rock shafts journaled opposite each of said sides and ends, a movably mounted element connected to some of said rock shafts, connections between said element and other of said rock shafts, means for actuating the first-mentioned rock shafts, whereby movement is imparted to said movably mounted element, and means actuated by the rock shafts for moving said sides and ends.

24. In a molding apparatus, the combination with a mold having movable sides and ends, of a rock shaft journaled opposite each of said sides, a rock shaft journaled opposite each of said ends, a bar movably mounted contiguous to one of the end rock shafts, connections between said end rock shaft and bar for conveying movement from the bar to the end rock shaft, connections between the side rock shafts and bar for conveying movement from the side rock shafts to the bar, means for simultaneously actuating said rock shafts and the other of said end rock shafts, and means actuated by the rock shafts for moving said sides and ends.

25. In a molding apparatus, the combination with a mold having movable sides, of a guiding casing connected with each of said sides, guiding means surrounding each of said casings for directing the same in its movement, and means within each of said casings for moving the same.

26. In a molding apparatus, the combination with a mold having movable sides, of means for guiding the same, a bodily movable bar for operating said guiding means, a link pivotally connected to said bar, a pivotally mounted bell crank lever engaging said link, and means for actuating said bell crank lever for moving said bar.

27. In a molding apparatus, the combination with a mold having movable sides and ends, of a casing of less horizontal area than said mold, adapted to be positioned upon the mold when the sides and ends thereof are in their closed position.

28. In a molding apparatus, the combination with a mold having movable sides, of a casing connected with each of said sides and formed with a longitudinal slot, an arm playing within the slot of each of said casings, means for moving said arms, means actuated by said arms for moving the respective casing.

29. In a molding apparatus, the combination with a mold having movable sides and ends, of a casing adapted to be positioned upon said mold when the sides and ends are in their closed position.

In testimony whereof I affix my signature in presence of two witnesses.

WILLIAM J. STERLING.

Witnesses:
A. S. J. GAMMEN,
J. P. DOWNING.